US012263500B2

(12) United States Patent
Jungklaus et al.

(10) Patent No.: US 12,263,500 B2
(45) **Date of Patent: *Apr. 1, 2025**

(54) COMPOUND APPLICATOR

(71) Applicant: AMES TOOLS CORPORATION, Suwanee, GA (US)

(72) Inventors: Matthew W. Jungklaus, Lawrenceville, GA (US); Michael T. Ventura, Palm Beach Gardens, FL (US)

(73) Assignee: Ames Tools Corporation, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,209

(22) Filed: Mar. 18, 2024

(65) Prior Publication Data

US 2024/0216944 A1 Jul. 4, 2024

Related U.S. Application Data

(63) Continuation of application No. 17/938,888, filed on Oct. 7, 2022, now Pat. No. 11,964,296.

(60) Provisional application No. 63/253,199, filed on Oct. 7, 2021.

(51) Int. Cl.
*B05C 17/005* (2006.01)

(52) U.S. Cl.
CPC .. *B05C 17/00503* (2013.01); *B05C 17/00593* (2013.01)

(58) Field of Classification Search
CPC .......... B05C 17/00503; B05C 17/0146; B05C 17/015
See application file for complete search history.

(56) References Cited

U.S. PATENT DOCUMENTS

| | | |
|---|---|---|
| 5,882,691 A | 3/1999 | Conboy |
| 6,379,080 B1 | 4/2002 | Saffo, Sr. |
| 6,581,805 B2 | 6/2003 | Conboy et al. |

(Continued)

OTHER PUBLICATIONS

International Preliminary Report on Patentability for Application No. PCT/US2022/077778 dated Apr. 9, 2024 (7 pages).

(Continued)

*Primary Examiner* — Frederick C Nicolas
*Assistant Examiner* — Randall A Gruby
(74) *Attorney, Agent, or Firm* — Michael Best & Friedrich LLP

(57) ABSTRACT

A compound applicator includes a nozzle assembly including a nozzle opening and a plug movable relative to the nozzle opening between a first position in which the nozzle assembly is in a closed state, and a second position in which the nozzle assembly is in an open state, a spring configured to bias the plug into the first position, a cylinder configured to receive and store a compound material, a main housing, a handle rotatable relative to the main housing, a pull rod having a first end coupled with the plug, and an input mechanism located at least partially within the handle and/or the main housing and configured to convert rotational motion of the handle into axial movement of the pull rod, thereby moving the plug from the first position toward the second position. The spring pulls the pull rod such that the pull rod is biased into tension.

19 Claims, 17 Drawing Sheets

(56) References Cited

U.S. PATENT DOCUMENTS

| | | | | |
|---|---|---|---|---|
| 7,721,377 | B2 * | 5/2010 | Jungklaus | E04F 21/165 15/235.8 |
| 10,427,122 | B1 | 10/2019 | Tapocik | |
| 2003/0072830 | A1 | 4/2003 | Conboy et al. | |
| 2006/0230564 | A1 | 10/2006 | Jungklaus et al. | |
| 2018/0014670 | A1 | 1/2018 | Chen | |
| 2021/0219525 | A1 | 7/2021 | O'Keefe et al. | |

OTHER PUBLICATIONS

International Search Report and Written Opinion for Application No. PCT/US2022/07778 dated Jan. 19, 2023 (10 pages).

Tapetech, "MudRunner (R)", <https://www.tapetech.com/products/Corner-Applicators/MudRunner%C2%AE>, website publicly available at least as early as 2014, 2 pages.

Austrailian Patent Office Action for Application No. 2022361064 dated Apr. 9, 2024 (3 pages).

New Zealand Patent Office Action for Application No. 807837 dated May 29, 2024 (3 pages).

* cited by examiner

COMPOUND APPLICATOR

CROSS-REFERENCE TO RELATED APPLICATIONS

This application is a continuation of U.S. application Ser. No. 17/938,888, filed Oct. 7, 2022, which claims priority to U.S. Provisional Patent Application No. 63/253,199, filed Oct. 7, 2021, the entire contents of which are herein incorporated by reference.

BACKGROUND

Compound applicators apply viscous fluid compounds such as dry wall compound, grout, caulk, sealants, etc. to joints and corners where dry wall tape and tape on corner bead is applied.

SUMMARY

The present disclosure relates to a compound applicator including a nozzle assembly including a nozzle opening and a plug movable relative to the nozzle opening between a first position in which the nozzle assembly is in a closed state, and a second position in which the nozzle assembly is in an open state, a spring configured to bias the plug into the first position, a cylinder configured to receive and store a compound material, a main housing coupled to the cylinder, a handle coupled to the main housing and rotatable relative to the main housing, a pull rod having a first end coupled with the plug, and an input mechanism located at least partially within the handle and/or the main housing and configured to convert rotational motion of the handle into axial movement of the pull rod, thereby moving the plug from the first position toward the second position. The spring pulls the pull rod such that the pull rod is biased into tension.

The present disclosure further relates to a compound applicator including a nozzle assembly including a nozzle opening and a plug movable relative to the nozzle opening between a first position in which the nozzle assembly is in a closed state, and a second position in which the nozzle assembly is in an open state, a spring configured to bias the plug into the first position, a cylinder configured to receive and store a compound material, a main housing coupled to the cylinder, a handle coupled to the main housing and rotatable relative to the main housing, a pull rod having a first end coupled with the plug, and an input mechanism located at least partially within the handle and/or the main housing and configured to convert rotational motion of the handle into axial movement of the pull rod. The input mechanism includes a first cam member defining an axial cam slot, a second cam member defining an angled cam slot, and a cam follower having a first roller follower configured to roll along the axial cam slot and a second roller follower configured to roll along the angled cam slot.

The present disclosure further relates to a compound applicator including a nozzle assembly including a nozzle opening and a plug movable relative to the nozzle opening between a first position in which the nozzle assembly is in a closed state, and a second position in which the nozzle assembly is in an open state, a spring configured to bias the plug into the first position, a cylinder configured to receive and store a compound material, a main housing coupled to the cylinder, a handle coupled to the main housing and rotatable relative to the main housing, a pull rod having a first end coupled with the plug, and an input mechanism located at least partially within the handle and/or the main housing and configured to convert rotational motion of the handle into axial movement of the pull rod, and an extension removably coupled to a distal end of the handle to increase an overall length of the compound applicator.

The present disclosure further relates to a compound applicator including a nozzle assembly including a nozzle opening and a plug movable relative to the nozzle opening between a first position in which the nozzle assembly is in a closed state, and a second position in which the nozzle assembly is in an open state, a spring configured to bias the plug into the first position, a cylinder configured to receive and store a compound material, a main housing coupled to the cylinder, a handle coupled to the main housing and rotatable relative to the main housing, a pull rod having a first end coupled with the plug, and an input mechanism located at least partially within the handle and/or the main housing and configured to convert rotational motion of the handle into axial movement of the pull rod, and a pin movable relative to the input mechanism through a slot in the handle, wherein the pin is configured to engage the input mechanism at a plurality of positions along the slot in the handle such that the position of the handle is adjustable relative to the main housing.

The present disclosure further relates to a compound applicator including a nozzle assembly including a nozzle opening, a cylinder configured to receive and store a compound material, a main housing coupled to the cylinder; and an accessory handle for a hand of the user and coupled to the main housing such that the primary handle is repositionable along a length of the main housing between a plurality of positions.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Figure 1:
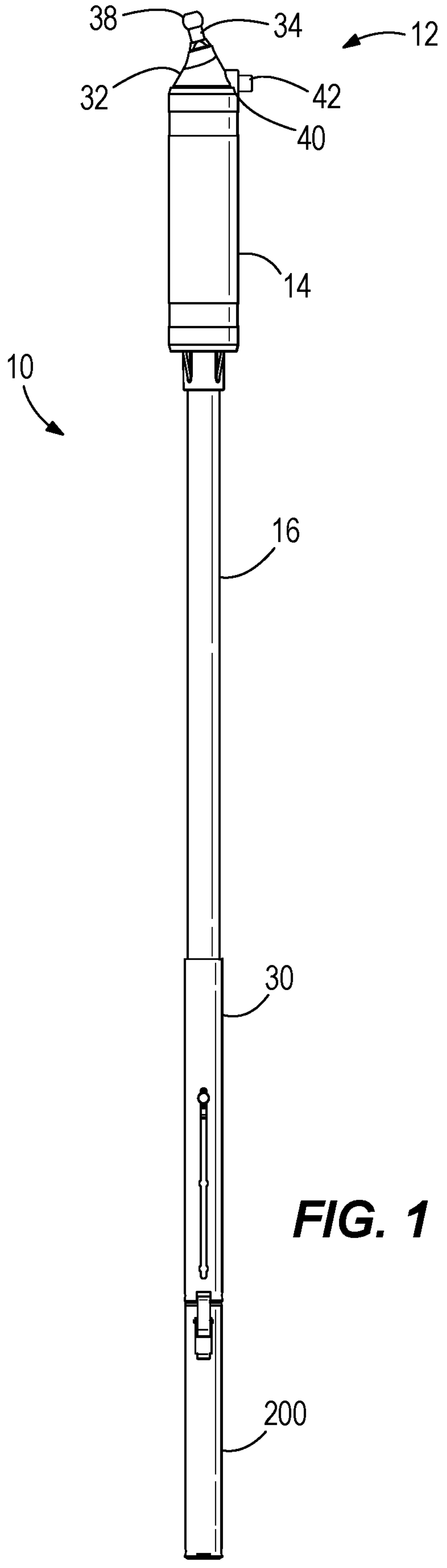
FIG. 1 is a front view of a compound applicator.
Figure 2:
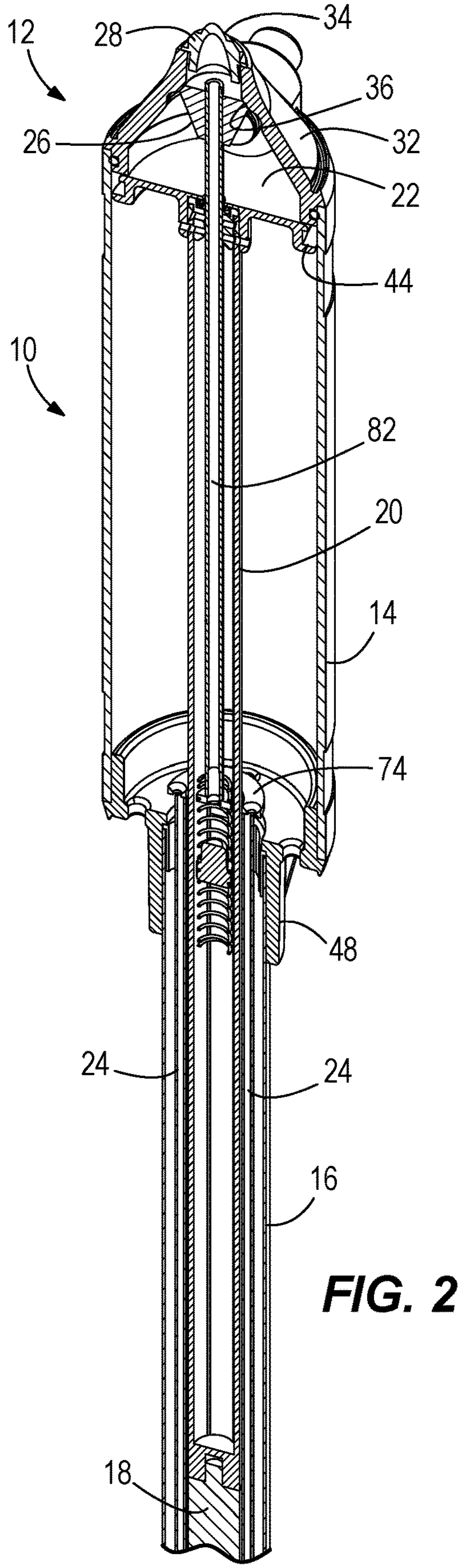
FIG. 2 is a cross-sectional perspective view of an applicator end of the compound applicator.
Figure 3:
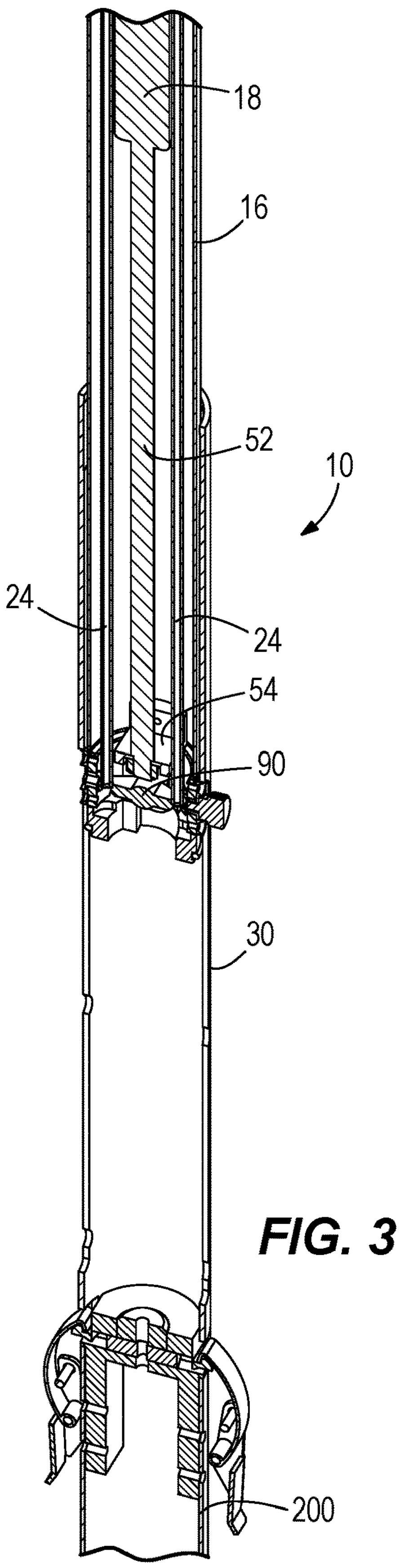
FIG. 3 is a cross-sectional perspective view of a middle portion of the compound applicator.

FIGS. 1-3 illustrate a compound applicator 10. The applicator 10 includes a compound filling and dispensing nozzle assembly 12, a clear plastic compound retaining cylinder 14, a main tubular housing 16, an air spring/gas spring 18 having a hollow push rod 20 connected between the gas spring 18 and a compound dispensing head 22, and an arrangement of pull rods 24, 82. A central pull rod 82 slidably mounted in the push rod 20 has a needle plug 26 on its leading end for sealing the dispensing nozzle opening 28. A spring biased control handle 30 is rotatably mounted on the main housing 16 and operatively connected to the rear end of two offset pull rods 24, whereby rotation of the handle 30 opens and closes the dispensing nozzle opening 28.

As shown in greater detail in FIG. 2, the nozzle assembly 12 includes a front nose 32 and a dispensing nozzle 34. Inside the front nose 32 is a plug seat 36 against which the plug 26 seats to seal the nozzle opening 28. The nozzle 34 has a ball 38 on the leading end (FIG. 1). Universal finishing heads or dry wall heads (not shown) are adapted to be attached to the ball 38. These have an internal spherical socket and are snapped onto the ball 38 to define a ball joint assembly which allows universal pivoting of the head.

A loading boss 40 is located on the nose 32 and is provided with a conventional spring-loaded fill valve assembly 42 which is opened to admit dry wall compound into the cylinder 14 and automatically closes when loading is stopped.

The dispensing head 22 is located inside the cylinder 14 and includes a peripheral wiper seal 44 to wipe the interior of the cylinder 14 and push the compound out of the cylinder during operation (FIG. 2). The seal 44 prevents the dry wall compound from getting behind the head during either filling or dispensing. The cylinder 14 is preferably made of a transparent plastic, such as polycarbonate, so that the operator can visually determine how much dry wall compound is in the cylinder 14. The pull rod 82 moves axially through the head 16 to seal and unseal the nozzle opening 28 by moving the plug 26.

The cylinder 14 is attached to the main housing 16 and to the nozzle assembly 12 by a housing cap 48 that couples at one end to the cylinder 14 and at another end to the main housing 16. Fasteners may be used to secure the housing cap 48 to one or more of the main housing 16 and the cylinder 14. In other embodiments, quick release snap rim retainer assemblies are secured to the cylinder 14 and have snap release retaining clips which clip onto suitable annular rims on the main housing 16 and the nozzle assembly 12 respectively. Another method of fastening the nozzle 12 and/or the housing 16 to the cylinder 14 is by a threaded connection.

Figure 8:
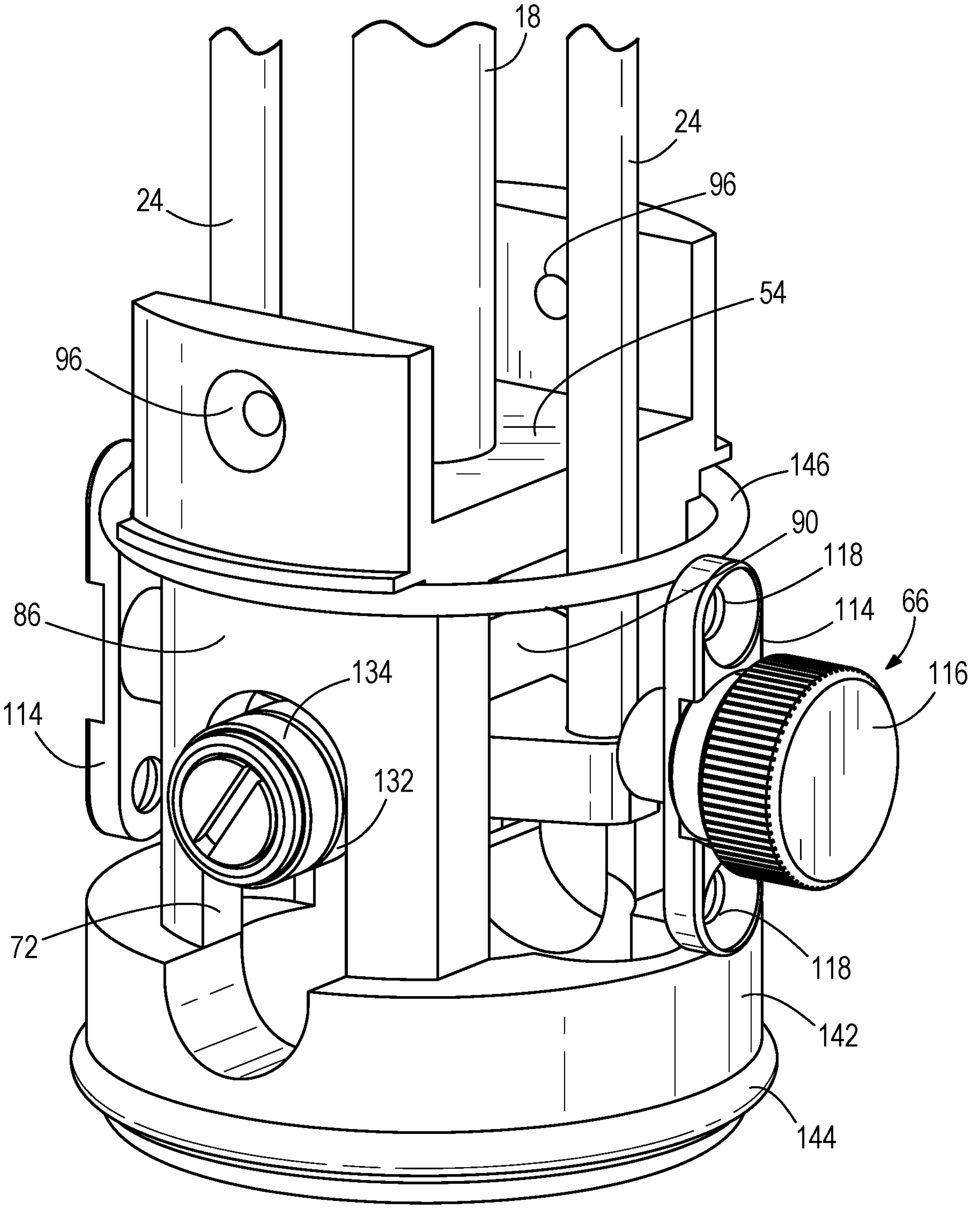
FIG. 8 is a third partially deconstructed perspective view of a mechanism within the handle portion of FIG. 4, shown with a second cam member and a housing additionally removed.
Figure 9:
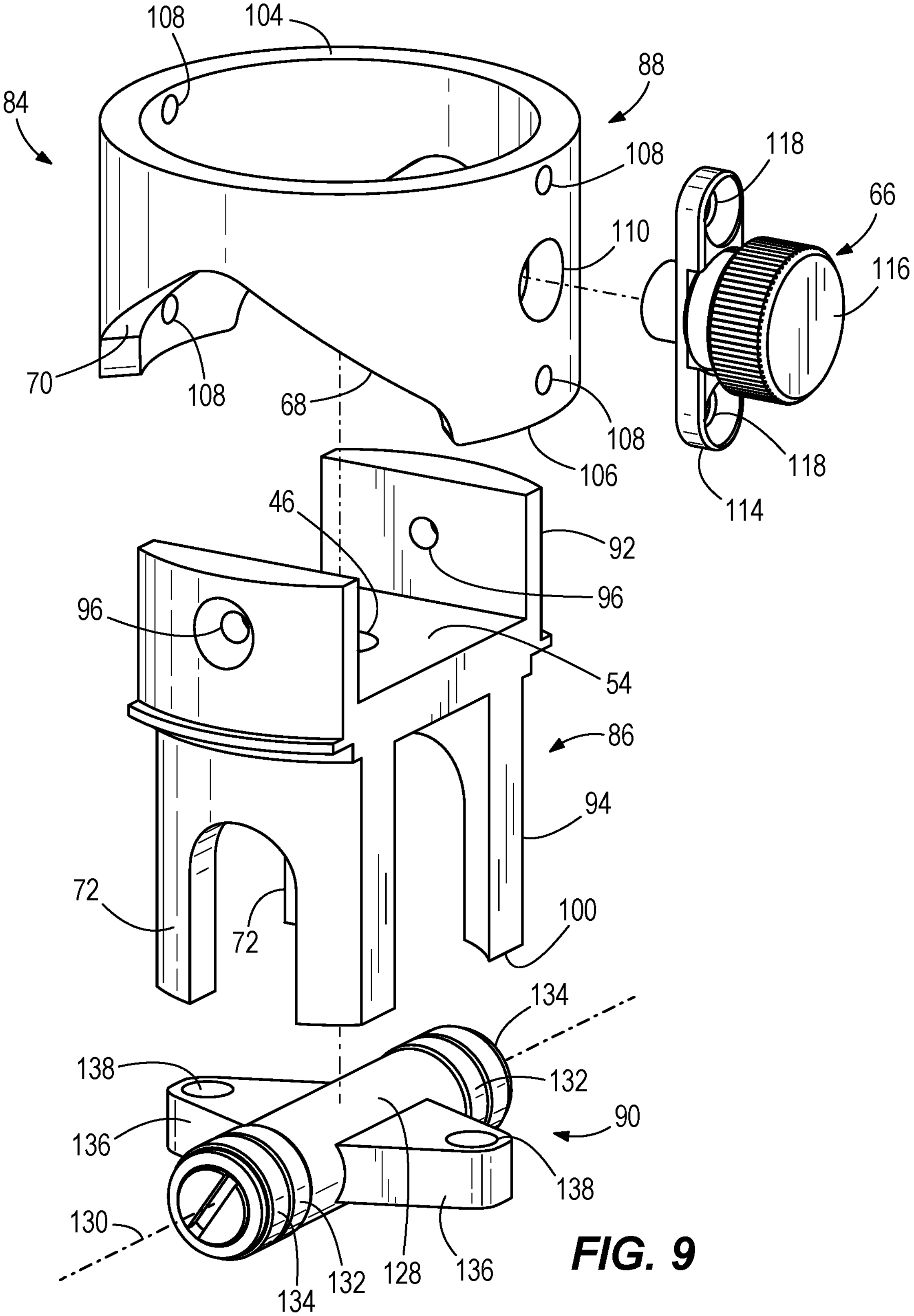
FIG. 9 is an exploded view of the mechanism.

A gas spring 18 is positioned within the main housing 16. The gas spring 18 is described in some detail in U.S. Pat. No. 5,882,691, the entire content of which is incorporated herein by reference. As seen in FIGS. 2, 3, and 8, the gas spring 18 has an extended shaft 52 which is anchored in an end cap 54 formed at a first cam member 86. As shown in FIGS. 8-9, the gas spring 18 extends through an opening 46 in the first cam member 86. The end of the gas spring 18 is coupled to the first cam member 86 via a fastener 50 (FIG. 10) such as a nut on the underside of the opening 46. The push rod 20 is secured to the forward end of the gas spring 18. As the cylinder fills with dry wall compound, the push rod 20 moves rearward and, in turn, moves the air spring 18 toward the end cap 54, thus moving the shaft 52 of the gas spring 18. This compresses the nitrogen gas in the gas spring 18 and effectively loads the gas spring 18 and pressurizes the compound in the cylinder 14.

As shown in FIGS. 6-10, an input mechanism 84 is located within the handle 30 and/or housing 16 and converts a user's rotational input at the handle 30 (relative to the housing 16) into an axial displacement of the needle plug 26 from the plug seat 36, thereby opening the nozzle and allowing the compound material to flow therefrom. With reference to FIG. 9, the input mechanism 84 includes a pin 66, the first cam member 86, a second cam member 88, and a cam follower 90.

The control handle 30 overlaps the main housing 16 and is rotatable with respect to the main housing 16. The first cam member 86 includes an upper portion 92 that extends within main housing 16 and a lower portion 94 that extends within the handle 30. The upper portion 92 includes mounting holes 96 for coupling the first cam member 86 to the main housing 16. A fastener (not shown) such as a threaded fastener (e.g., a screw, a bolt) or rivet may be inserted into and through overlapping and aligned mounting holes 96, 98 (FIG. 7) in the first cam member 86 and main housing 16, respectively, to axially and rotationally couple the first cam member 86 to the main housing 16. The lower portion 94 of the first cam member 86 includes a pair of axial and longitudinal slots 72 (FIG. 9). The longitudinal slots 72 extend from a lower end 100 of the first cam member 86 toward the upper portion 92, each defining an archway-shaped opening through the opposite sides of the lower portion 90. The longitudinal slots 72 define a first path for the cam follower 90.

The second cam member 88 has an annular cross-section perpendicular to the longitudinal length of the applicator 10. The annular cross-section extends from a first lengthwise end 104 towards an opposite, second lengthwise end 106, though the annular cross-section is interrupted by cutouts as described in greater below. The cam member 88 has an outer diameter defining an outer circular profile of the second cam member 88 and an inner diameter defining an inner circular profile. The inner diameter of the second cam member 88 is greater than an outer dimension of the first cam member 86 such that the first cam member 86 is receivable within the second cam member 88. The second cam member includes a set of angled cam slots 68, 70 that form a chevron cutout extending upward from the second lengthwise end 106 of the second cam member 88, peaking at a position between first and second lengthwise ends 104, 106. The cam slots 68, 70 define a second path for the cam follower 90. The second cam member 88 further defines openings 108, 110 extending radially through the annular cross-section for mounting the pin 66 thereto.

As shown in FIGS. 6-8 and 10, the first cam member 86 is positioned within the second cam member 88 such that, at least in some positions, the first path for the cam follower 90 and the second path for the cam follower 90 are aligned with one another. While the first cam follower 86 is fastened to the main housing 16, the second cam follower 88 is not directly coupled to either of the main housing 16 or the handle 30.

The pin 66 includes an elongated bracket 114 and a fastener 116. The fastener 116 may be, for example, a threaded fastener such as a thumb screw, having a threaded shaft and a tactile head engageable by a user's fingers to thread the thumb screw into the elongated bracket 114. The elongated bracket 114 includes a length longer than a width with openings 118, 120 spaced apart similar to the openings 108, 110 located on the second cam member 88. The outermost openings 108, 118 accept fasteners (e.g., threaded fasteners such as screws, bolts) for coupling the elongated bracket 114 to the second cam member 88. The central opening 120 is threaded to receive the threaded fastener 116 and is inset within a boss feature that is inserted within the opening 110 in the second cam member 88. As such, the pin 66 is removably coupled to the second cam member 88 and the fastener 116 is movable (i.e., by unthreading) relative to the elongated bracket 114 and may be fully removable the elongated bracket 114.

Figure 4:
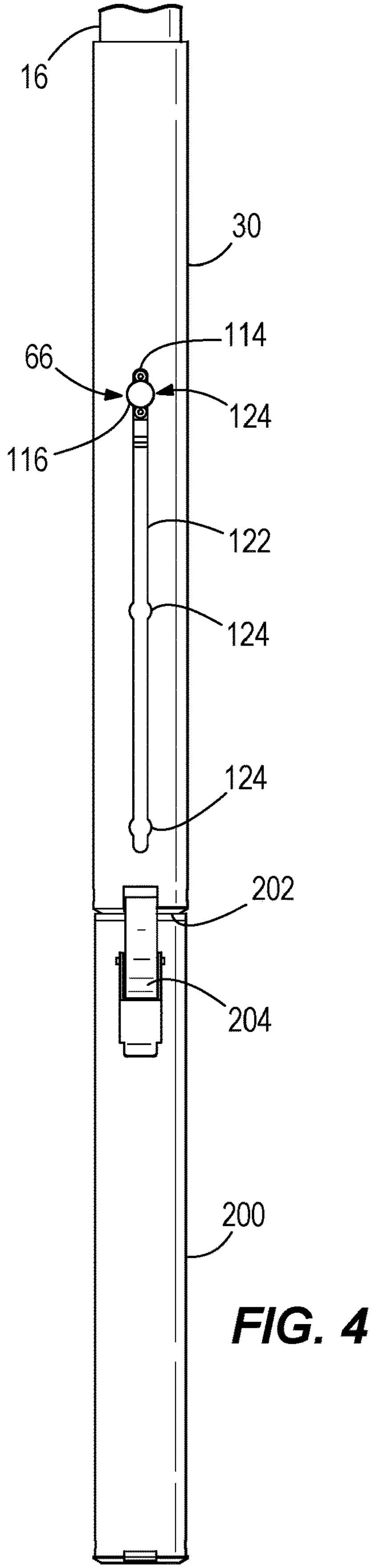
FIG. 4 is an enlarged view of a handle portion of the compound applicator of FIG. 1.

As shown in FIG. 4, the handle 30 includes a longitudinal, axial slot 122 that extends along a portion (e.g., 40%-75% of the length) of the handle 30. The slot 122 has a width substantially similar to the width of the elongated bracket 114 such that the bracket 114 is slidable along the length of the slot 122. Additionally, rotation of the handle 30 is transmitted to the input mechanism 84 via the interaction/contact between the bracket 114 and the slot 122. By sliding the bracket 114 within the slot 122, the handle 30 slides relative to the main housing 16, thereby increasing or decreasing the overall length of the applicator 10. The slot 122 includes circular cutouts 124 having a width greater than the width of the remainder of the slot 122 that function as detents. When fully threaded onto the bracket 114, the fastener 116 sits within the recess to prevent axial movement of the handle 30 relative to the housing 16 without first unthreading the fastener 116 to remove the fastener 116 from the cutout 124. To adjust the length of the applicator 10, the fastener 116 is partially or fully unthreaded until the fastener 116 disengages the cutout 124. The handle 30 is then axially translated relative to the housing 16, the motion being limited by the bracket 114 positioned within the slot 122 until the fastener 116 can be reengaged with a different cutout 124. The slot 122 shown in FIG. 4 can therefore permit movement of the handle 30 between three distinct positions based on the three circular cutouts 124. In other embodiments, more or fewer cutouts 124 may be provided to set more or fewer distinct axial lengths of the applicator 10. In still other embodiments, a different fastener/detent feature, such as a spring biased ball, may replace the fastener 116.

With reference to FIG. 9, the cam follower 90 includes cylindrical body 128 defining a rotational axis 130 about which a plurality of roller followers 132, 134 (e.g., bearings, bearing bushings) rotate. The roller followers 132, 134 rotate relative to the cylindrical body 128 to limit friction between the roller followers 132, 134 and the slots 68, 70, 72 in which the roller followers move. Inner roller followers 132 engage (i.e., ride along) the first path defined by the longitudinal slots 72. Outer rollers 134 positioned radially outward from the inner rollers 132 engage (i.e., ride along) the second path defined by the angled cam slots 68, 70. Each of the roller followers 132, 134 rotate about the same axis 130 with each inner roller follower 132 positioned adjacent (e.g., directly adjacent, indirectly adjacent with a spacer positioned therebetween) to an outer roller follower 134. The cam follower 90 further includes wings 136 that extend outward from the cylindrical body 128, perpendicular to the rotational axis 130. Each of the wings 136 includes an opening 138 for supporting one of the offset pull rods 24 such that both of the pull rods 24 are coupled to the cam follower 90. Fasteners (not shown) extend axially through the openings 138 and into the ends of the pull rods 24 to secure the pull rods 24 to the cam follower 90.

When assembled, the cam follower 90 is positioned within the first cam member 86, which in turn is positioned within the second cam member 88. The combination of the angled slots 68, 70 in the second cam member 88 and the axial slots 72 in the first cam member 86 translate the angular rotational input of rotating the handle 30 relative to the main housing 16 into linear motion to move the pull rods 24, 82 and retract the plug 26 from the nozzle opening 28.

Figure 6:
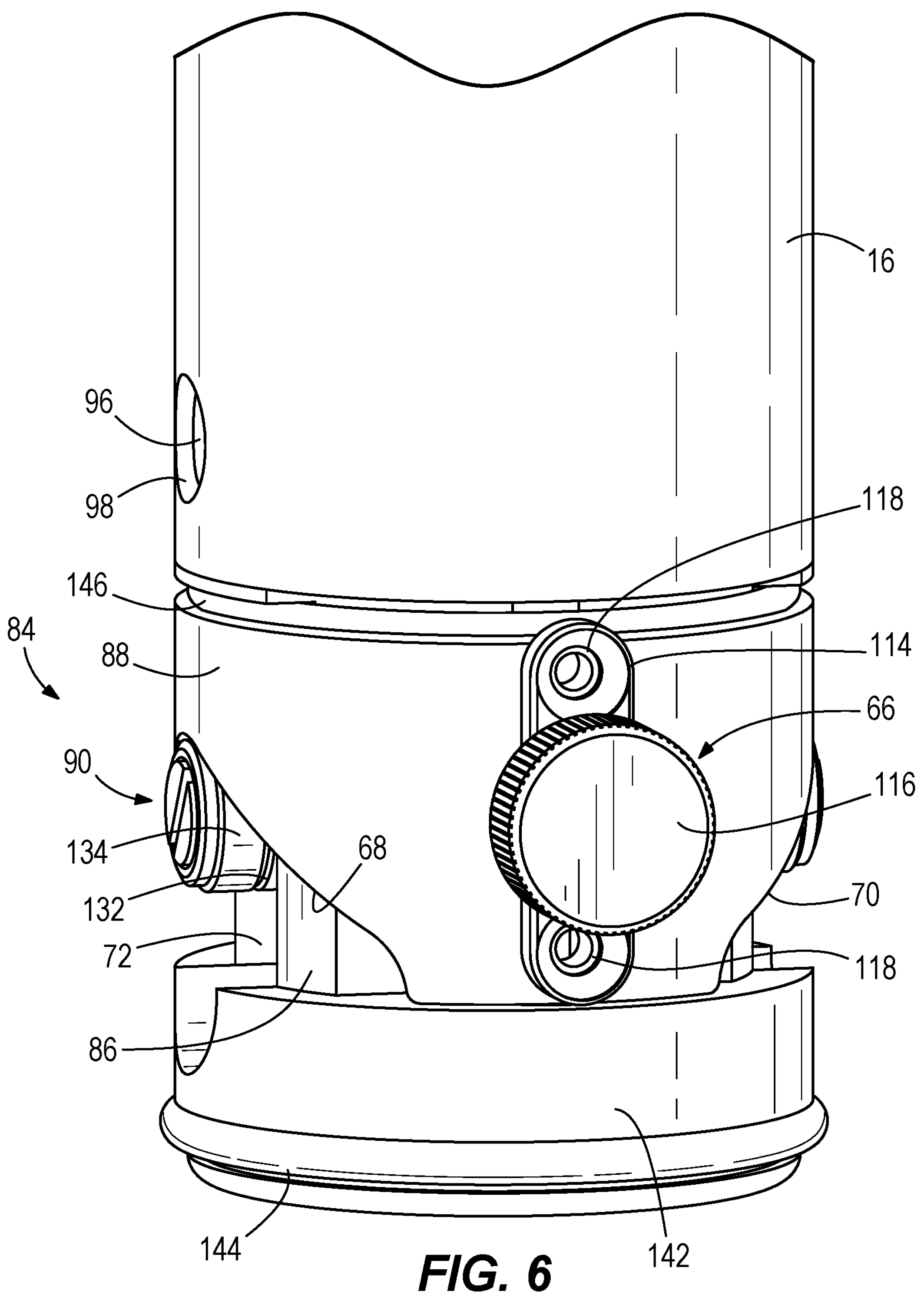
FIG. 6 is a first partially deconstructed perspective view of a mechanism within the handle portion of FIG. 4.
Figure 7:
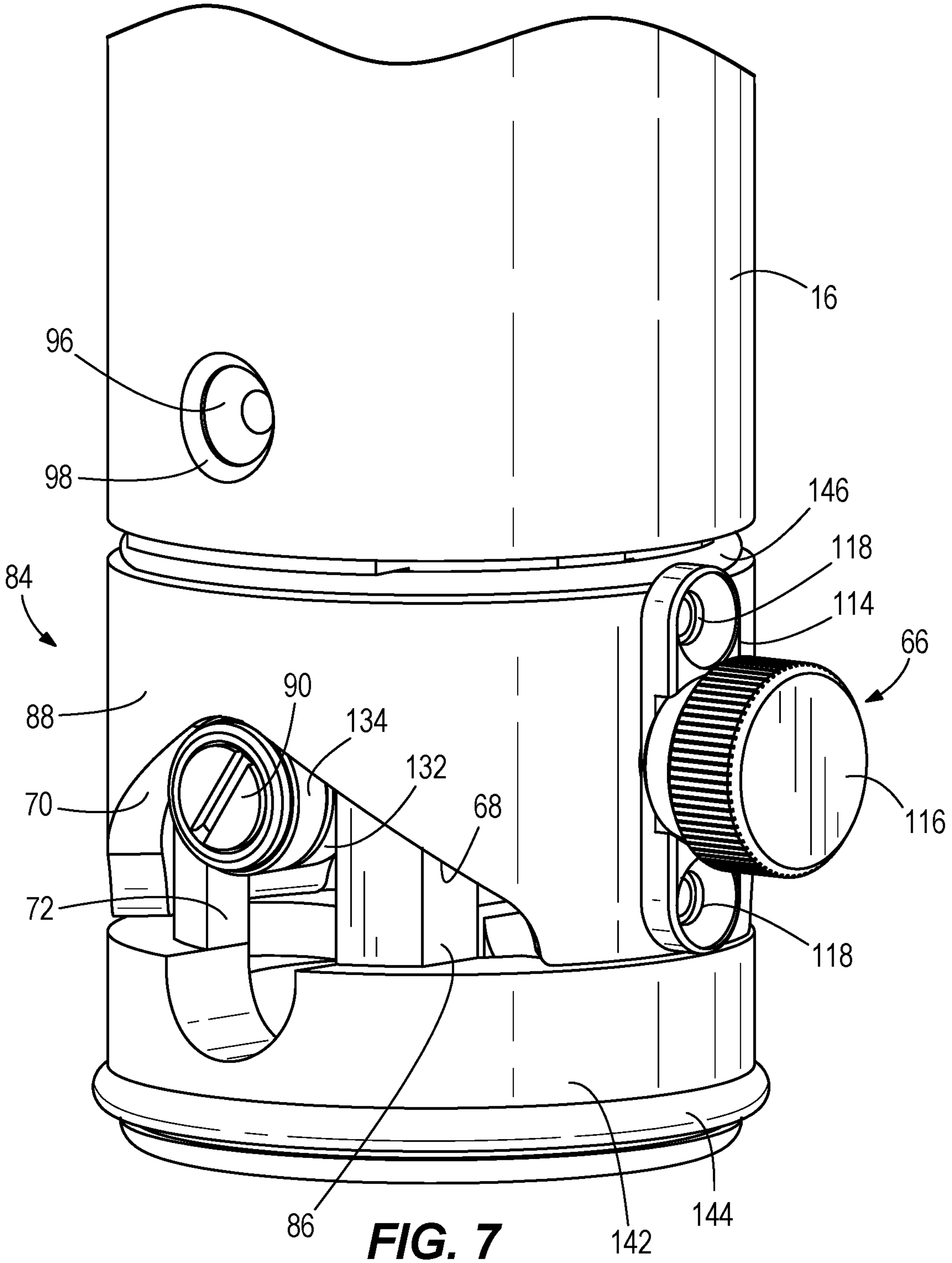
FIG. 7 is a second partially deconstructed perspective view of a mechanism within the handle portion of FIG. 4, showing a different angle than shown in FIG. 6.
Figure 10:
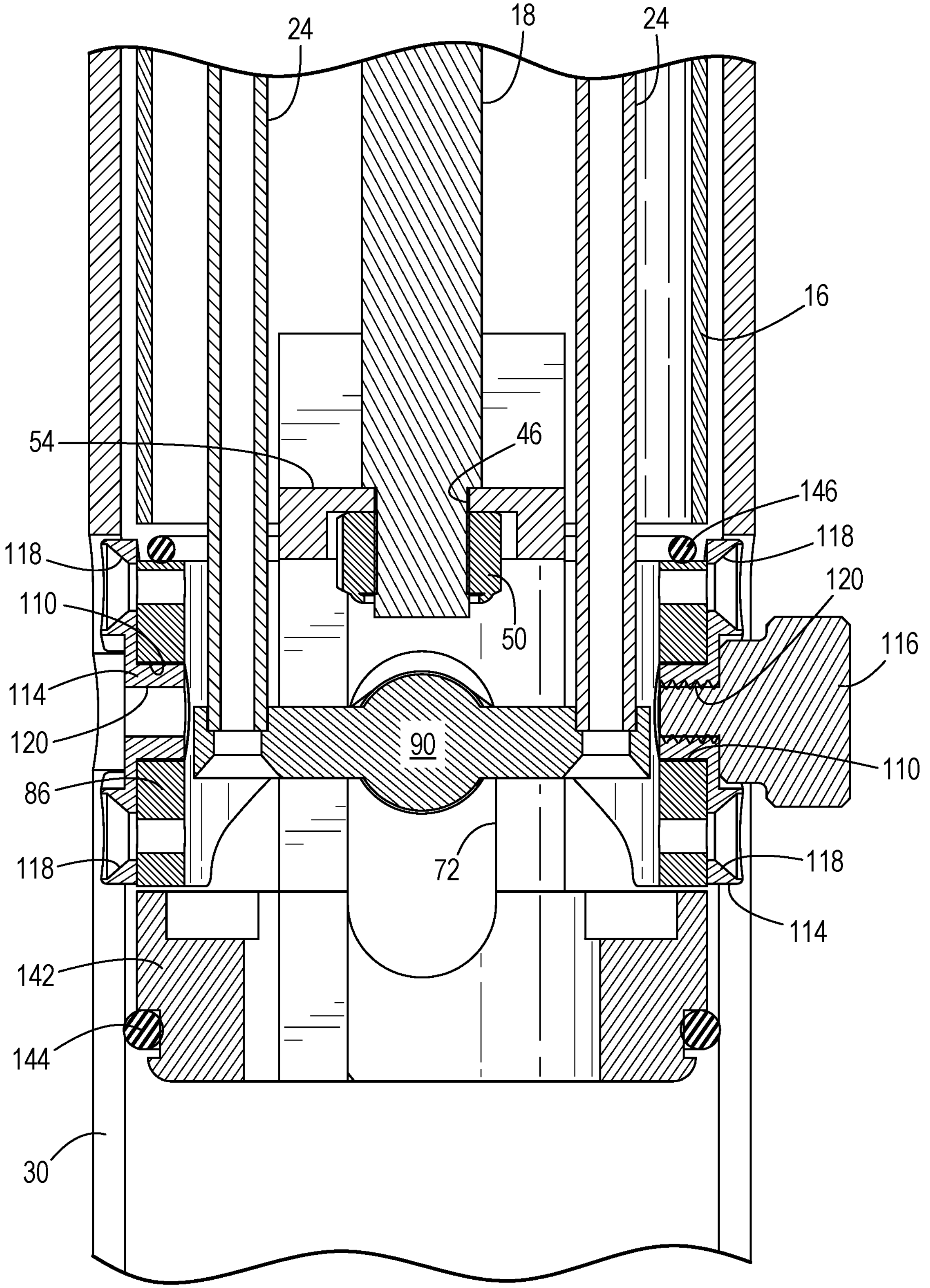
FIG. 10 is a cross-sectional view of the mechanism.

A bottom guide 142 is positioned adjacent the lower end 100 of the first cam member 86 and includes a radial seal 144 in the form of an O-ring (FIG. 10). The bottom guide 142 may be coupled to the first cam member 86 (and therefore indirectly coupled to the main housing 16) via, for example, axial fasteners (not shown). The bottom guide 142 may further define a portion (e.g., a lower portion) of the first path for the cam follower 90. As shown in FIG. 6, an additional seal 146 (e.g., O-ring) is positioned between a radial lip of the first cam member 86 and the upper end 104 of the second cam member 88.

Figure 11:
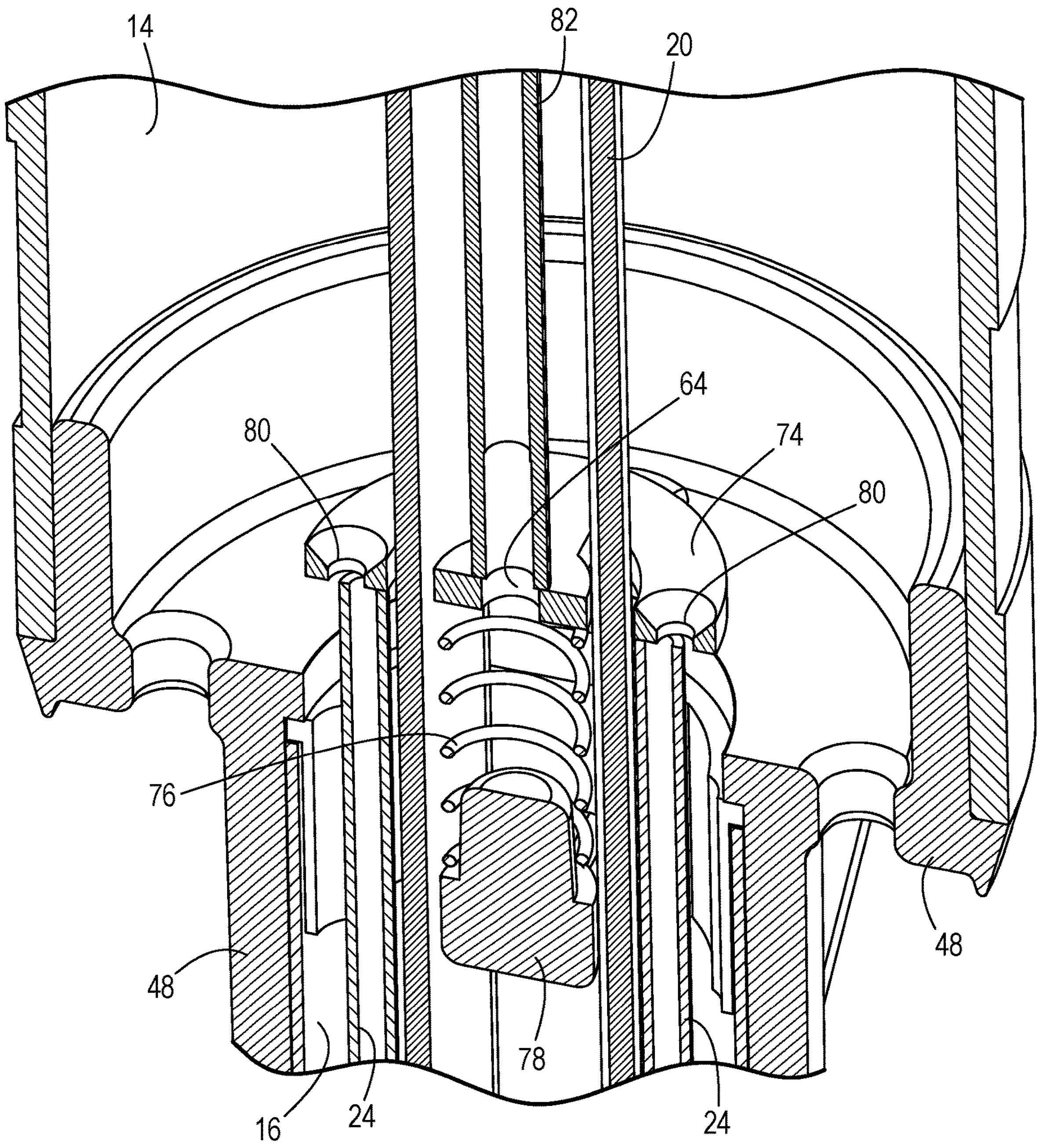
FIG. 11 is an enlarged cross-sectional perspective view of a biasing assembly of the compound applicator.

As shown in FIG. 11, a pull pad 74 is positioned within the main housing 16 and/or the compound retaining cylinder 14 forward of the handle 30 and forward of the gas spring 18 (i.e., between the gas spring 18 and the needle plug 26). The pull pad 74, similar to the cam follower 90, includes openings 80 for receiving fasteners (not shown) to couple the pull rods 24 to the pull pad 74. The pull rods 24 therefore extend between the cam follower 90 and the pull pad 74. The central pull rod 82 extends axially from the pull pad 74 toward the front nose 32 and to the needle plug 26. The central pull rod 82 is fastened to the pull pad 74 (e.g., via a fastener extending through the central opening 64 in the pull pad 74) such that linear translation of the pull pad 74 (e.g., via the pull rods 24 and cam follower 90) results in similar translation of the central pull rod 82 and the needle plug 26. A spring 76 is positioned below the pull pad 74 (e.g., between the pull pad 74 and the air spring 18) and extends between the pull pad 74 and a seat defined by a control cap 78 that is secured within the main housing 16. The spring 76 biases the pull pad 74, pull rods 24, 82, needle plug 26, and cam follower 90 into an upper position in which the needle plug 26 closes the nozzle opening 28. As the spring 76 biases the pull rods 24 into tension, the pull rods 24 can be longer and made of a lighter material than pull rods that are in compression.

Thus, when the control handle 30 is rotated, interaction/contact between the bracket 114 and the slot 122 transmits the rotation of the handle 30 into rotation of the second cam member 88. The outer roller followers 134 move in the slots 68, 70 and the inner roller followers 132 move in the slots 72 to move the pull rods 24 and pull pad 74 rearward. The pull pad 74, in turn, pulls the central pull rod 82 rearward, thereby opening up the dispensing nozzle 34. After the dispensing nozzle 34 is opened, the gas spring 18 pushes the compound material through the nozzle opening 28. When the handle 30 is released, the spring 76 urges the pull pad 74 forward to move the central pull rod 84 forward to reseat the plug 26 in the plug seat 36 and stop dispensing compound from the nozzle 28.

Figure 5:
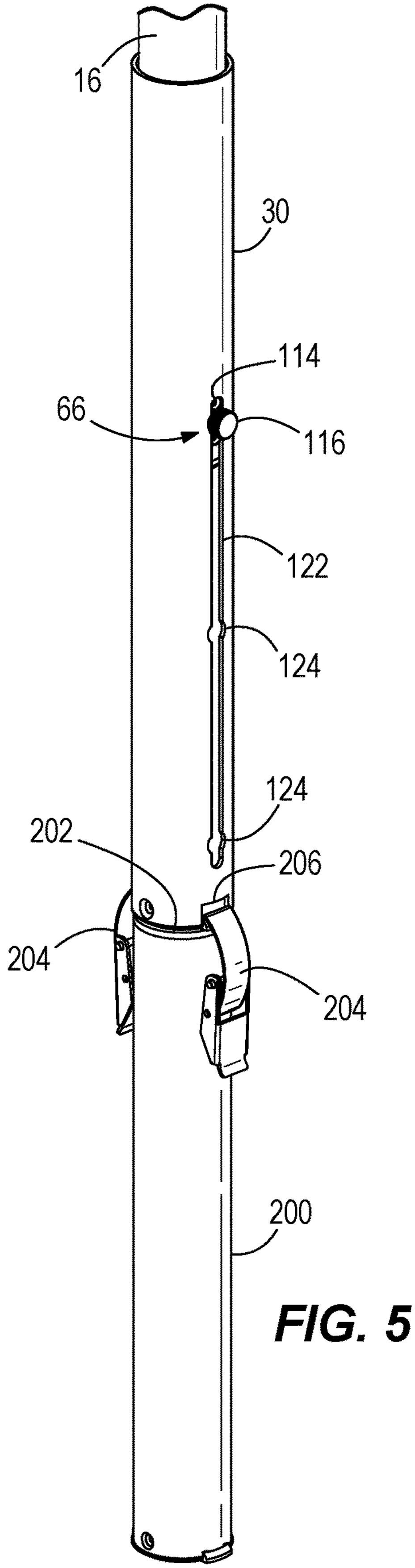
FIG. 5 is a perspective view of the handle portion of FIG. 4.

With reference to FIGS. 4-5, the length of the handle 30 of the applicator 10 may be extended by coupling an extension 200 to a distal end 202 of the handle 30. As shown, the extension 200 has a diameter similar to the diameter of the handle 30 and is coupled to the handle 30 such that rotation of the handle 30 results in similar rotation of the 200. Likewise, rotation of the extension 200 results in similar rotation of the handle 30. In this way, if a user grasps the extension 200 (e.g., in order to reach a higher point on a wall), the user is able to rotate the extension 200 relative to the main housing 16 (rather than rotating the handle 30), thereby resulting in the dispensing of the compound material from the nozzle opening 28 as previously described.

In some embodiments, the extension 200 is approximately twelve inches in length (e.g., eight to sixteen inches), extending the overall length of the applicator 10 by the same length. Such a distance may provide the additional height needed to more comfortably reach upper wall heights while maintaining a reasonable distance between a first hand position on the extension 200 and a second hand position on the main housing 16 (above the handle 30).

With continued reference to FIGS. 4-5, a pair of toggle latches or leaf spring clamps 204 couple the extension 200 to the handle 30 with a distal end of each of the toggle latches 204 extending into a slot or cutout 206 in the handle 30. The toggle latches 204 hold the extension 200 axially against the distal end 202 of the handle 30 and additionally prevent relative rotation between the extension 200 and the handle 30.

Figure 12:
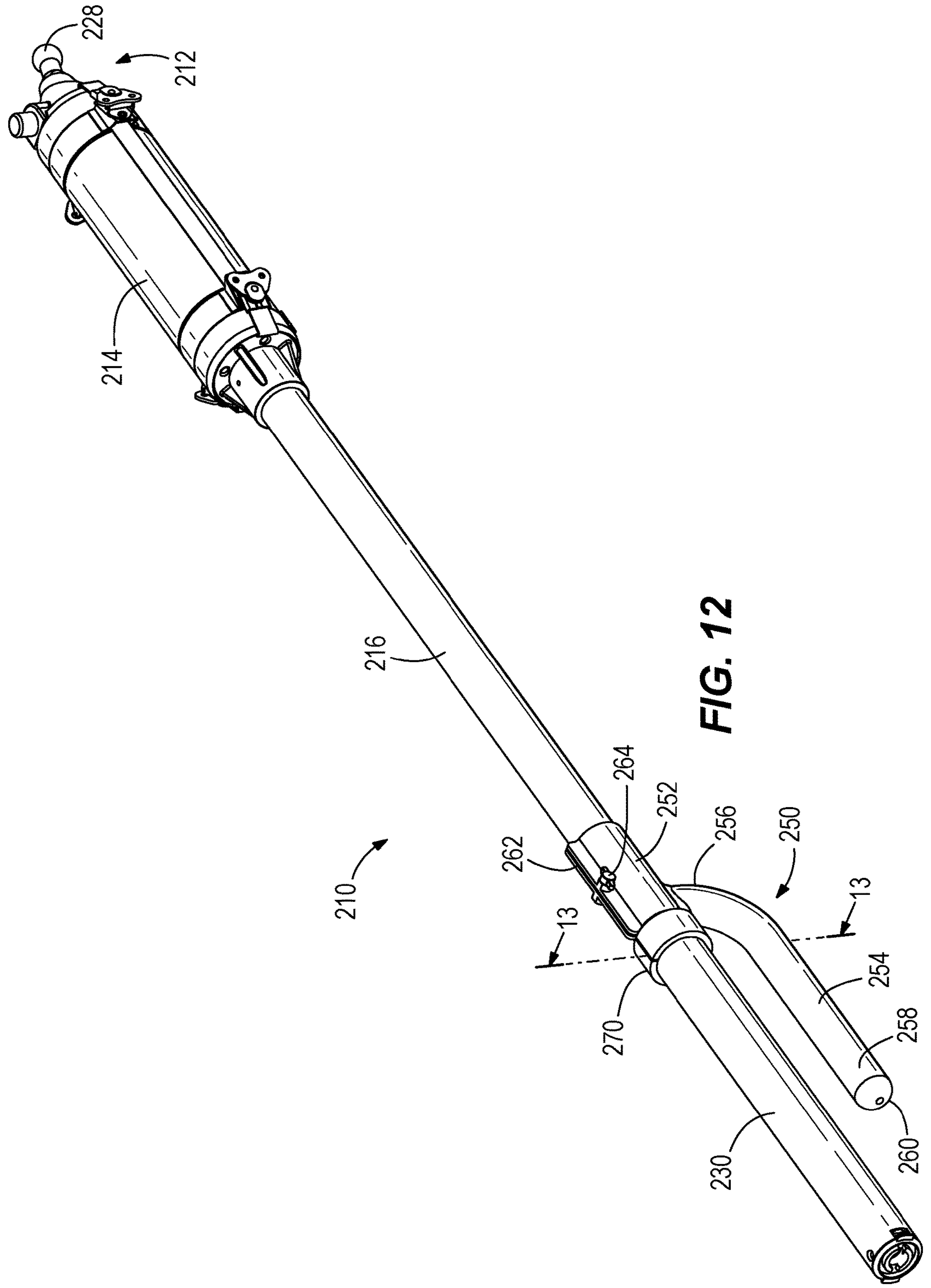
FIG. 12 is a perspective view of a compound applicator according to another embodiment.
Figure 13:
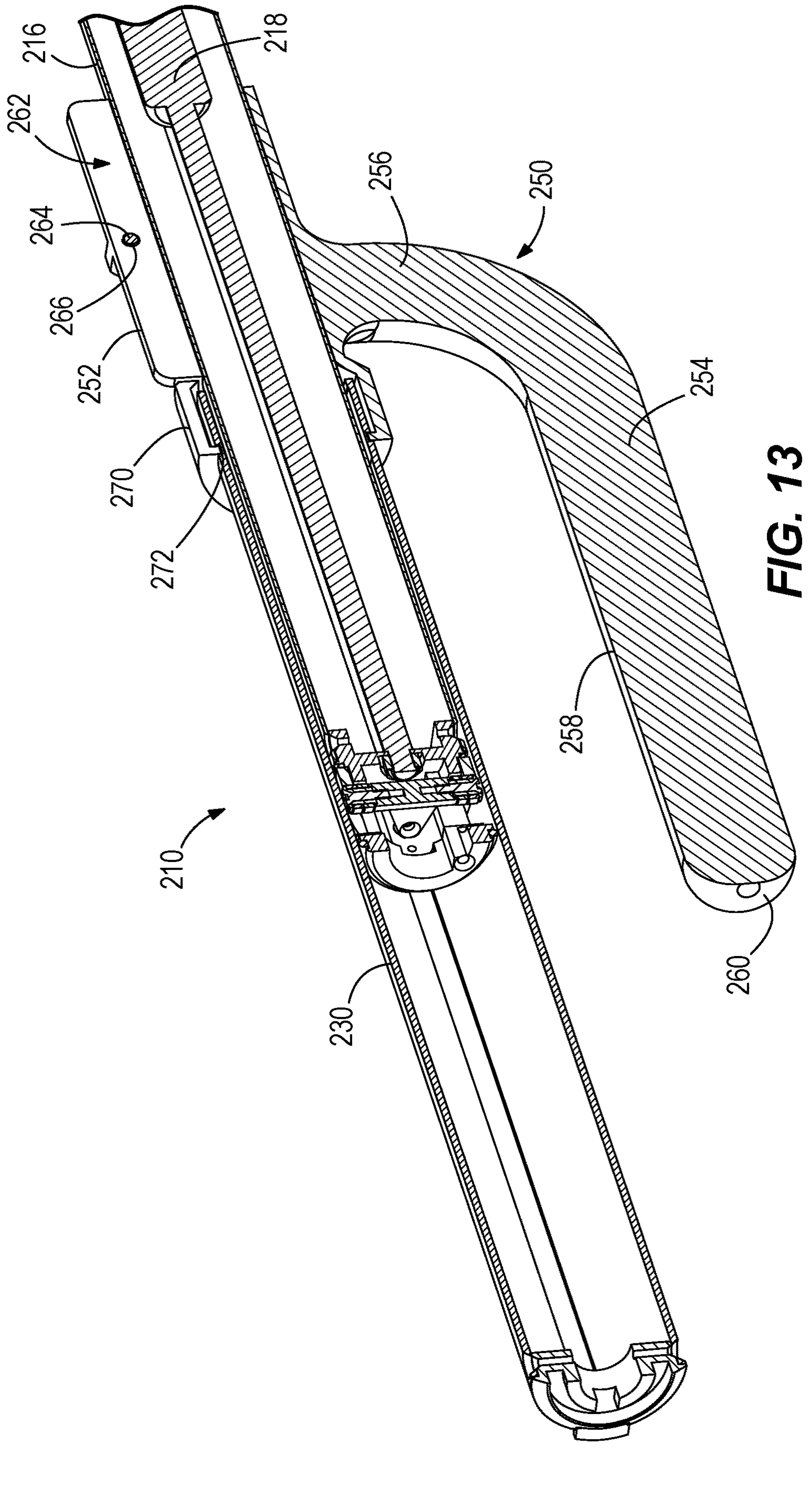
FIG. 13 is a cross-section of a handle portion of the compound applicator of FIG. 12.

FIGS. 12-13 illustrate a compound applicator 210 similar to the compound applicator 10 shown in FIGS. 1-11 except as otherwise described. The compound applicator 210 includes a nozzle assembly 212 having a dispensing nozzle opening 228, a compound retaining cylinder 214, a main tubular housing 216, an air spring/gas spring 218 and a primary handle 230 that opens and closes the dispensing nozzle opening 228. The compound applicator 210 also includes an accessory handle 250 mounted to the main tubular housing 216 at a location adjacent to the primary handle 230. The primary handle 230 is axially aligned with the tubular housing 216 and the nozzle opening 228 and the accessory handle 250 is offset from the primary handle 230. The accessory handle 250 includes a connector portion 252 for connecting the accessory handle 250 to the tubular housing 216 and a gripping portion 254 extending from the connector portion 252 for a user to grasp as a secondary handhold. The gripping portion 254 is generally J-shaped or L-shaped, with a first portion 256 extending outward and away from the main tubular housing 216 and primary handle 230 and a second portion 258 extending from the first portion 256 to a distal end 260 of the accessory handle 250. The second portion 258 of the accessory handle 250 extends substantially parallel (e.g., +5 degrees, +10 degrees, +15 degrees) to the primary handle 230 and is sized to allow a hand to grasp thereon. The gripping portion 254 of the accessory handle 250 has a generally cylindrical shape with a circular cross-section, though other cross-sections (e.g., oval, stadium, squircle, etc.) may be utilized.

The accessory handle 250 is located adjacent to the primary handle 230 such that a planar cross-section perpendicular to the length of the compound applicator 210 taken through the primary handle 230 also includes the secondary handle. In some embodiments, the above-referenced cross-section is taken through the primary handle 230 at a mid-point of the length of the primary handle 230. In some embodiments, the two handles 230, 250 can each be grasped by a respective hand of the user at a similar position along the length of the compound applicator 210. As shown, the primary handle 230 extends further rearward along the length of the compound applicator 210 than the accessory handle 250.

Without an accessory handle 250, a user holds the compound applicator 210 by placing a first hand on the primary handle 230 and a second hand on the tubular housing 216. With the accessory handle 250, the user places a first hand on the primary handle 230 and a second hand on the accessory handle 250. As the accessory handle 250 is coupled to the tubular housing 216, the functionality of holding the tubular housing 216 with the second hand is transferred to the accessory handle 250 while increasing the reach of the compound applicator 210 by locating both of the user's hands closer to each other and further away from the dispensing nozzle opening 228.

Additionally, if an extension (similar to extension 200 shown in FIGS. 4-5) is mounted to the distal end of the primary handle 230, the axial distance along the compound applicator 210 between a user's hands on the extension and the accessory handle 250 corresponds to the axial distance along the compound applicator 210 between a user's hands on the primary handle 230 (without an extension) and the tubular housing 216. As such, the accessory handle 250 functions as an extension for the tubular housing 216.

The connector portion 252 of the accessory handle 250 is a tube clamp that extends around the tubular housing 216 and has an axially extending slit 262 which can be closed to tighten the clamp. A clamp screw 264 is received in aligned apertures 266 (e.g., threaded apertures) on opposing sides of the slit 262 to tighten the accessory handle 250 about the tubular housing 216 and lock its position on the housing 216. In some embodiments, both apertures 266 are threaded. In other embodiments, only one aperture 266 is threaded. In still other embodiments, neither aperture 266 is threaded and the clamp screw 264 extends through the apertures 266 to engage a nut. When the clamp screw 264 is loosened, the connector portion 252 is rotatable about the tubular housing 216 so that the accessory handle 250 can be moved to different locations based on user preference (e.g., desired hand position, left or right handedness).

The connector portion 252 further includes a cylindrical coupler 270 that extends around a portion of the primary handle 230 to couple the accessory handle 250 to the primary handle. The coupler 270 allows relative rotation between the two handles 230, 250 and, when the clamp screw 264 is loosened, allows simultaneous and similar axial movement of the two handles 230, 250 along the housing 216. When the clamp screw 264 is tightened, the accessory handle 250 is tightened and locked to the housing 216 and to the primary handle 230, thereby tightening and locking the axial position of the primary handle 230 relative to the housing 216. In some embodiments, this locking arrangement may be utilized in place of the fastener 116 and slot 122 described above with respect to the compound applicator 10 shown in FIGS. 1-11. As shown, the slit 262 additionally extends axially through the cylindrical coupler 270 so that the tightening of the slit 262 provided by the clamping force of the clamp screw 264 results in a clamping force at the cylindrical coupler 270. In some embodiments, the cylindrical coupler 270 includes an inwardly extending radial protrusion 272 (as shown an inwardly extending ring) that engages the primary handle 230 or a slot within the primary handle 230 to provide a clamping force between the two handles 230, 250 while still permitting relative rotation between the two handles 230, 250.

Figure 14:
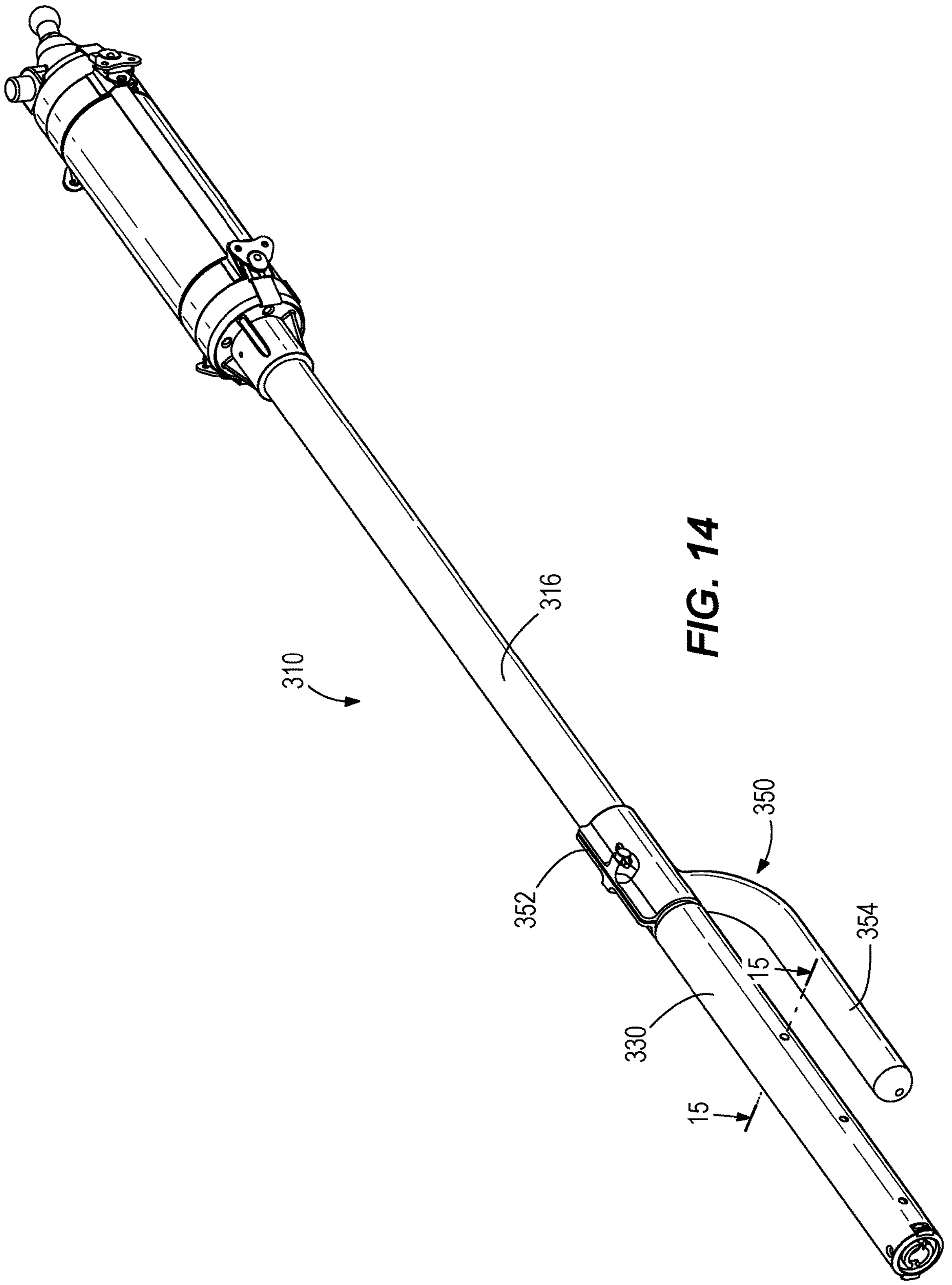
FIG. 14 is a perspective view of a compound applicator according to another embodiment.
Figure 15:
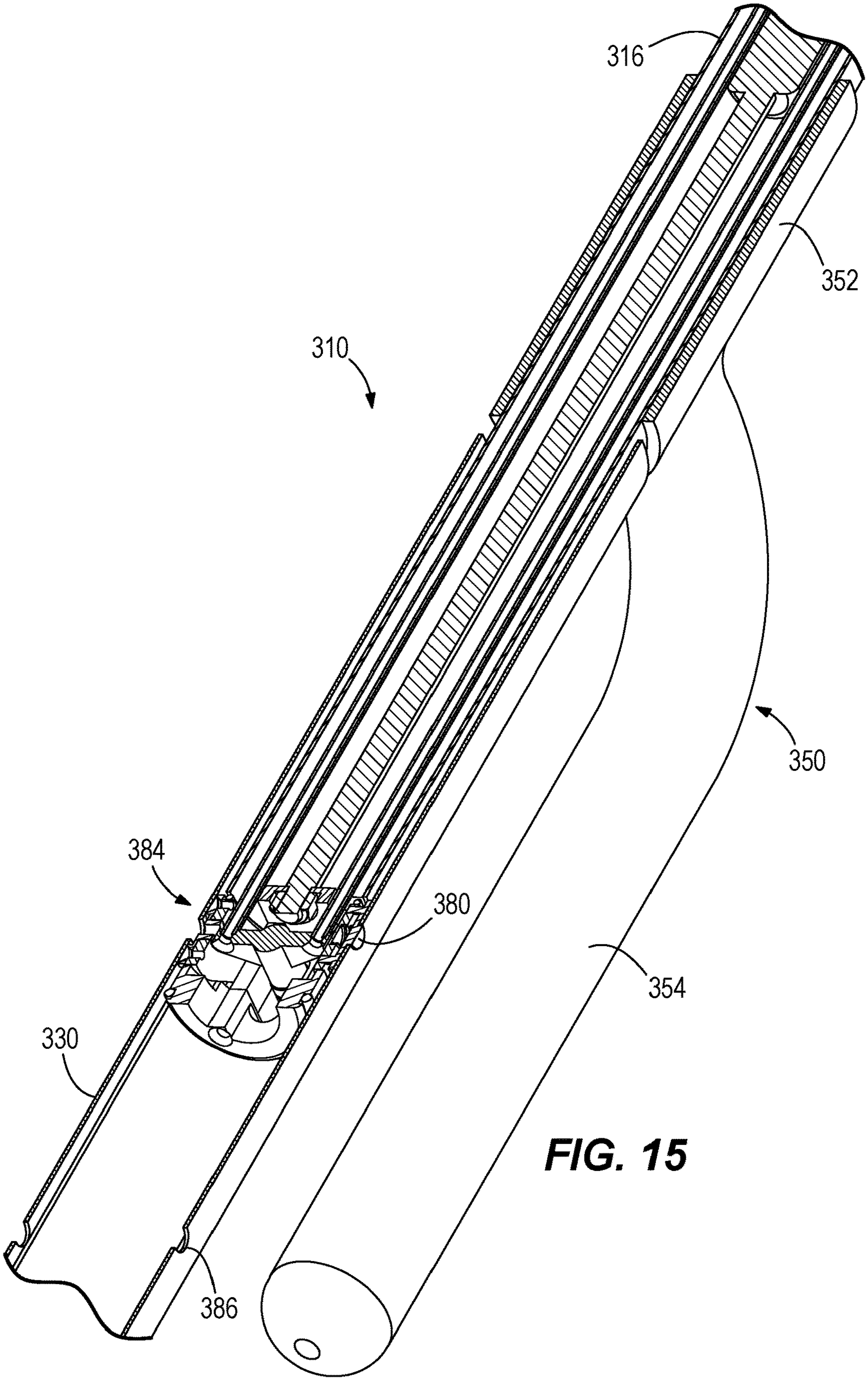
FIG. 15 is a cross-section of a handle portion of the compound applicator of FIG. 14.
Figure 16:
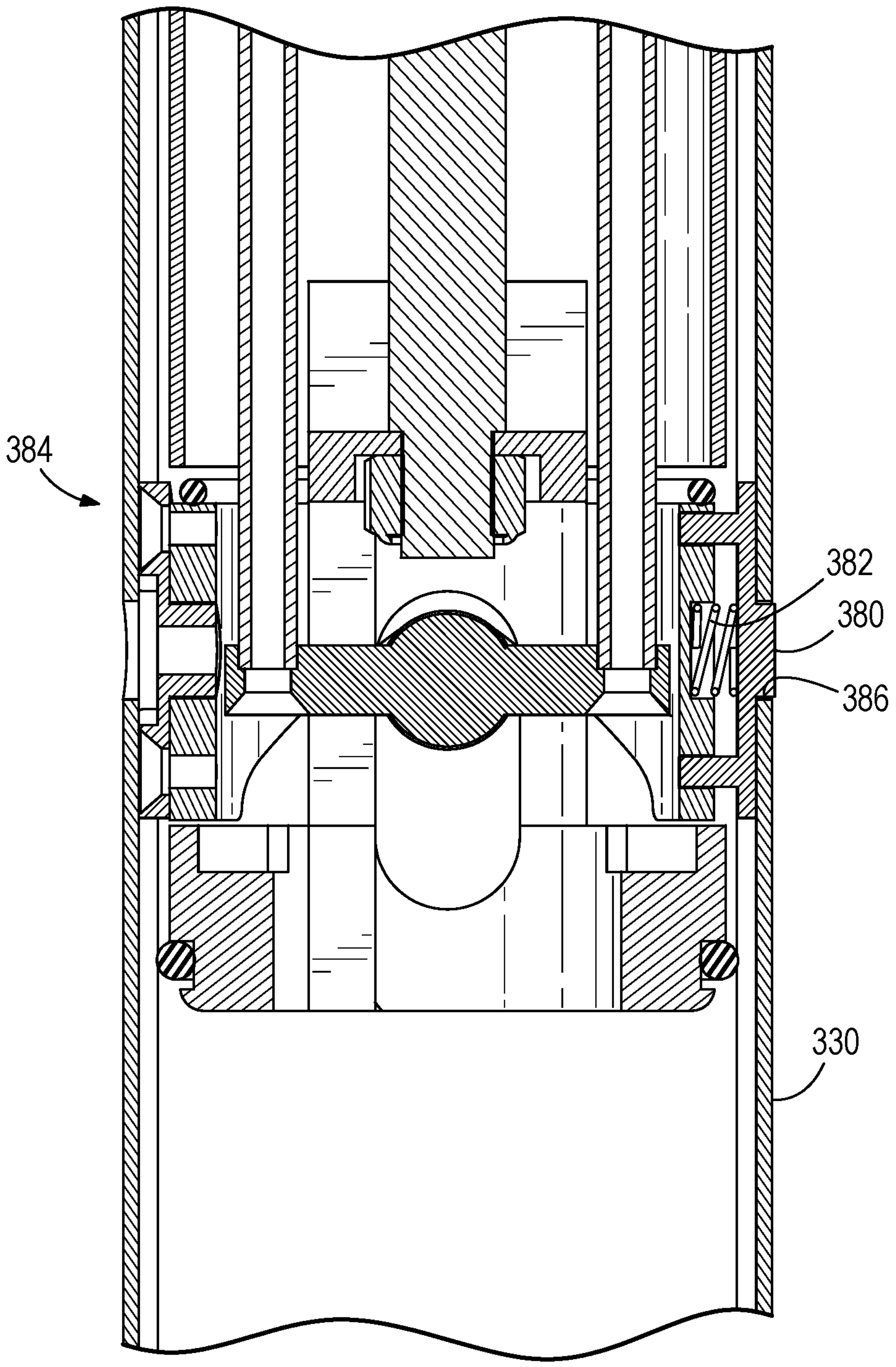
FIG. 16 is a mechanism within the handle portion of FIG. 15.

FIGS. 14-16 illustrate a compound applicator 310 similar to the compound applicator 210 shown in FIGS. 12-13 except as otherwise described. As shown, the accessory handle 350 includes a connector portion 352 and a gripping portion 354 and is similar to the accessory handle 250 but omits the cylindrical coupler for coupling the accessory handle 350 to the primary handle 330. As such, the accessory handle 350 is coupled solely to the housing 316 without coupling to the primary handle 330. As such, the accessory handle 350 is movable relative to the primary handle 330 along the length of the housing 316 to create a larger range of potential axial distances between the primary and accessory handles 330, 350, thereby accommodating a larger range of user arm lengths. The accessory handle 350 also therefore remains stationary on the tubular housing 316 when the primary handle 330 is moved axially along the length of the housing 316.

Rather than incorporating a fastener 116 and slot 122 (as described above with respect to the compound applicator 10 shown in FIGS. 1-11) for adjusting an axial position of the primary handle 330 along the housing 316, the compound applicator 310 includes a detent 380 biased by a spring 382 into engagement with discrete apertures 386 spaced apart from one another along a length of the primary handle 330. In some embodiments, the detent 382 may be a ball detent, while in other embodiments, such as is shown in FIG. 16, the detent 382 is a button mounted to a plate that is coupled to the input member 384 (similar to the input member 84) and movable (e.g., translating, deformable) against the spring bias. To adjust the axial position of the primary handle 330 relative to the housing 316, the user pushes the detent 380 against the bias of the spring 382 until it clears the aperture 386. The user then axially translates the primary handle 330 along the housing 316 until the detent 380 engages the desired one of the apertures 386. If the connector portion 352 of the accessory handle 350 interferes with the desired axial translation of the primary handle 330, a user can loosen the clamp screw 364 of the connector portion 352 and move the accessory handle 350 out of the path of the primary handle 330.

Figure 17:
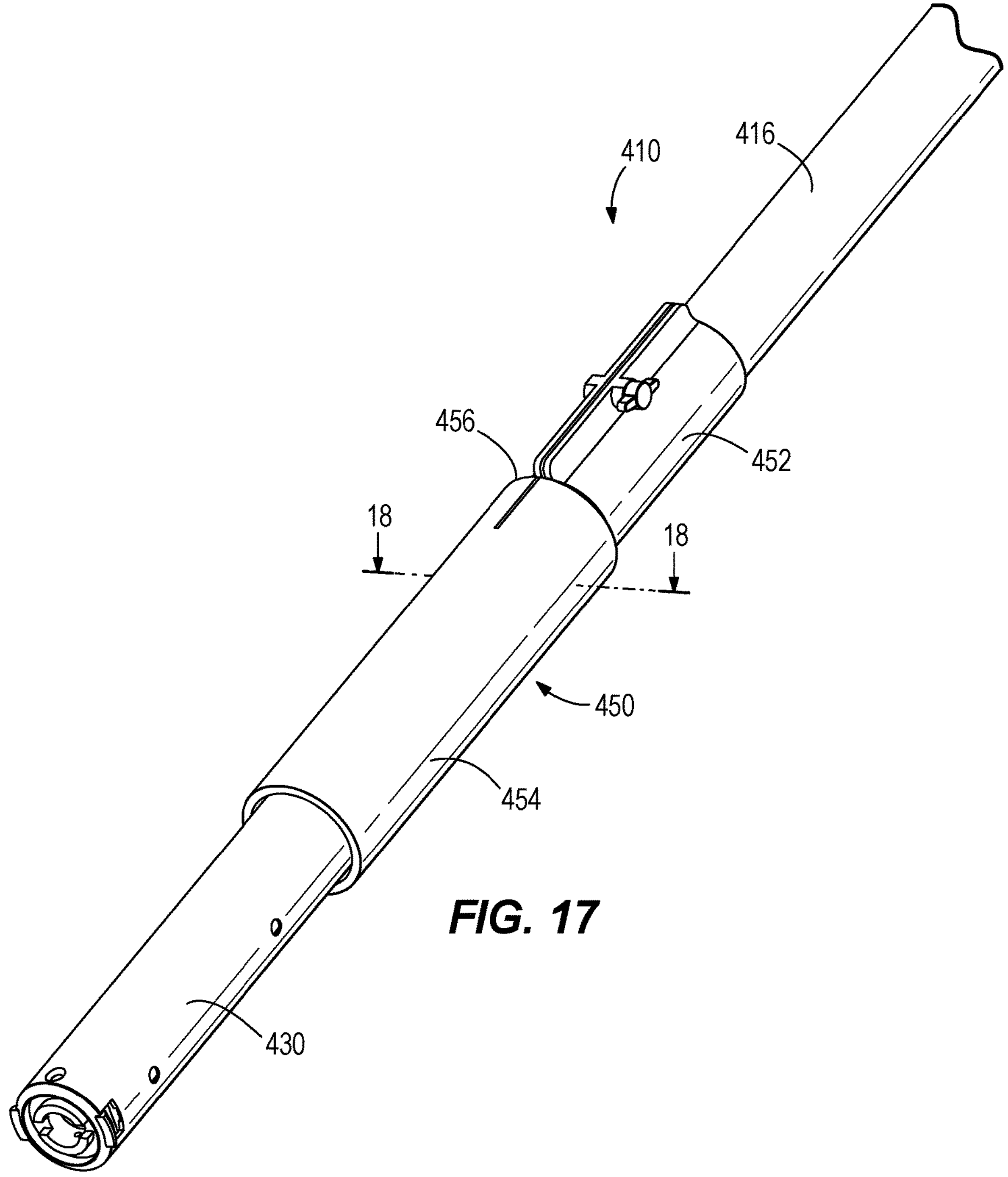
FIG. 17 is a perspective view of a handle portion of a compound applicator according to another embodiment.
Figure 18:
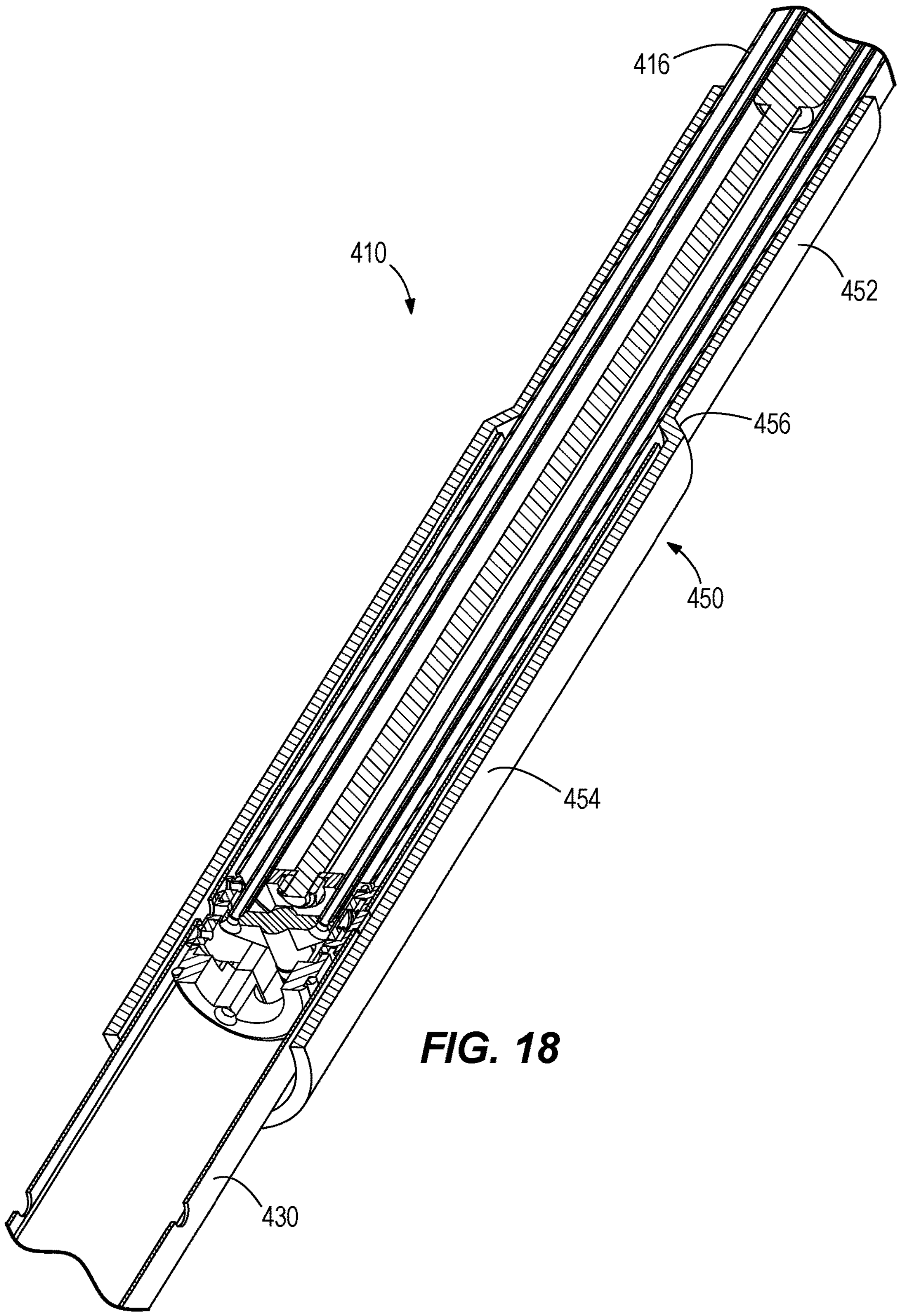
FIG. 18 is a cross-section of the handle portion of FIG. 17.

FIGS. 17-18 illustrate a compound applicator 410 similar to the compound applicator 210 shown in FIGS. 12-13 except as otherwise described. The connector portion 452 of the accessory handle 450 is similar to the connector portion 252 described with respect to FIGS. 12-13, but rather than incorporating an offset accessory handle, the gripping portion 454 extending from the connector portion 452 for a user to grasp as a secondary handhold is coaxial with the primary handle 430 and surrounds a portion of the housing 416 and a portion of the primary handle 430. The gripping portion 454 is generally tubular and includes a hollow inner diameter that is slightly larger than the outer diameter of the primary handle 430 so that a portion of the primary handle 430 nests within the accessory handle 450. As shown in the cross-section of FIG. 18, the connector portion 452 of the accessory handle 450 is coaxial and longitudinally offset from the gripping portion 454 and is connected to the gripping portion via a transition 456 that connects the connector portion 452 to the gripping portion 454. As the primary handle 430 has a larger outer diameter than the housing 416, the transition 456 has a radial component to bridge the difference between the two diameters. Similar to the offset handle 250, by locating the gripping portion 454 lower, the functionality of holding the tubular housing 416 with the second hand is transferred to the accessory handle 450 while increasing the reach of the compound applicator 410 by locating both of the user's hands closer to each other and further away from the dispensing nozzle opening.

Figure 19:
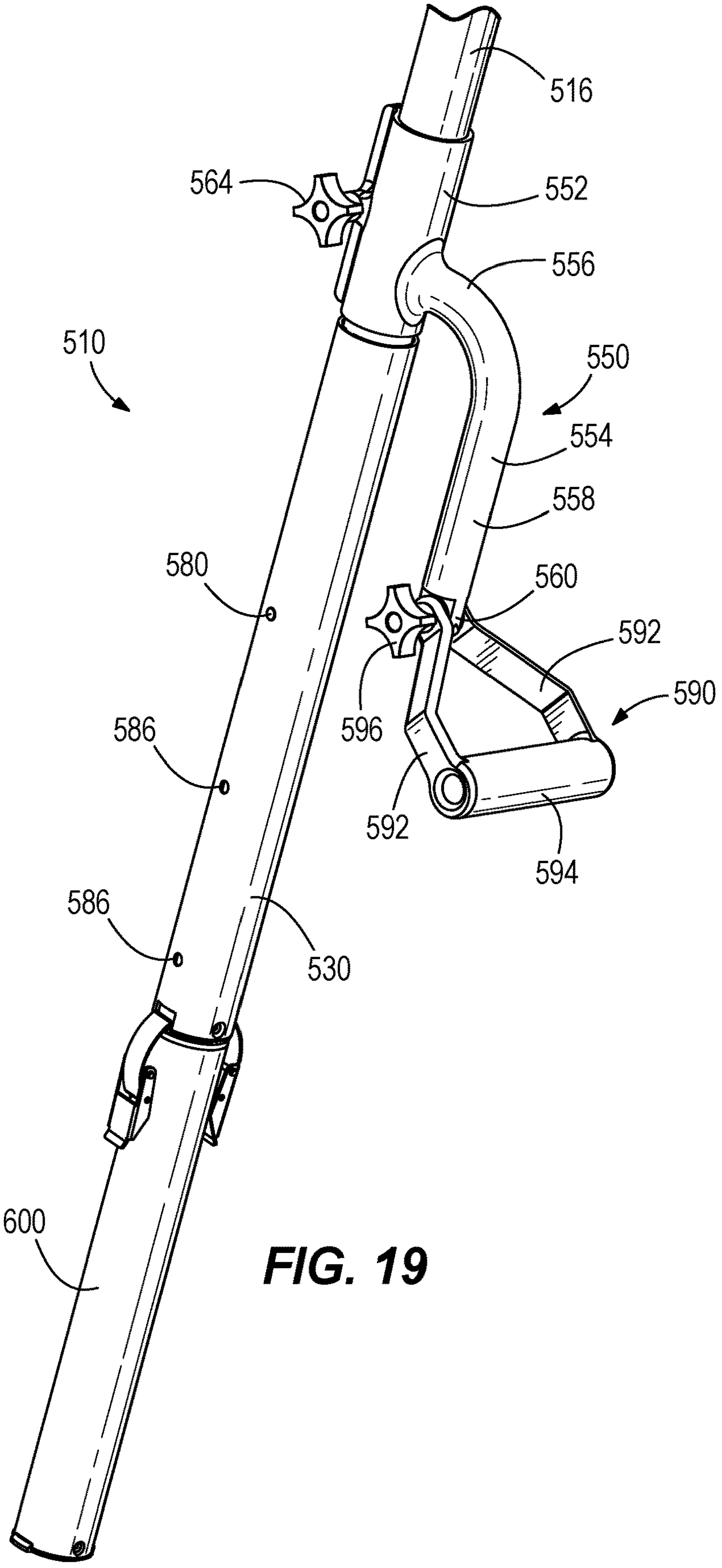
FIG. 19 is a perspective view of a handle portion of a compound applicator according to another embodiment.

FIG. 19 illustrates a compound applicator 510 similar to the compound applicator 310 shown in FIGS. 14-16 except as otherwise described. As shown, the accessory handle 550 includes a connector portion 552 and a gripping portion 554 extending from the connector portion 552. The gripping portion 554 includes radial and longitudinal portions 556, 558 (similar to first and second portions 256, 258, respectively) and extends substantially parallel to the handle 530. The longitudinal portion 558 terminates at a distal end 560. The gripping portion 554 further includes a D-shaped grip 590 coupled to the distal end 560 and rotatable relative to the distal end 560. The D-shaped grip 590 includes first and second connectors 592 that are each coupled to the longitudinal portion 558 at a first end and coupled to a handle 594 at a second end. At the first end, the connectors 592 are coupled to opposing sides of the distal end 560 of the longitudinal portion 558 and each include openings through which a fastener 596 is inserted. The fastener 596 extends through a first connector 592, through the longitudinal portion 558, and then through a second connector 592 to couple the D-shaped grip 590 to the longitudinal portion 558. As the second end, the connectors 592 connect to opposing sides of the handle 594. The handle 594 is a cylindrical handhold for a user and has a central axis that is generally perpendicular to the longitudinal axes of the primary handle 530 and the longitudinal portion 558 of the accessory handle 550. Such an arrangement allows a user to grasp the primary handle 530 with a first hand and grasp the handle 594 of the accessory handle 550 with a second hand, with the two hands rotated into perpendicular positions.

The fastener 596 (e.g., clamp screw) can be loosened to rotate the D-shaped grip 590 relative to the longitudinal portion 558 of the accessory handle 550 and can be tightened when the D-shaped grip 590 is in any of a plurality of rotated positions (e.g., multiple positions where the axis of the handle 594 is perpendicular to the longitudinal portion 558 of the accessory handle 550) so that the D-shaped grip 590 can be used in any of the rotated positions, as desired. As shown, the head of the fastener 596 is enlarged relative to the clamp screw 264 shown and described with respect to FIG. 12 to provide a larger handhold for a user to grasp when making adjustments. The head of the clamp screw 564 is similarly larger in size than the clamp screw 264.

The compound applicator 510 includes a detent 580 biased by a spring (similar to spring 382) into engagement with discrete apertures 586 spaced apart from one another along a length of the primary handle 530. The compound applicator 510 further includes an extension 600 similar to the extension 200. As such, a user is able to grasp the extension 600 with a first hand and grasp the handle 594 of the accessory handle 550 with a second hand, thereby significantly increasing the range of the compound applicator while still allowing a user to provide relative rotation between the body 516 and the primary handle 530.

Although some aspects have been described in detail with reference to certain preferred embodiments, variations and modifications exist within the scope and spirit of one or more independent aspects as described.

What is claimed is:

1. A compound applicator comprising:

a nozzle assembly including a nozzle opening and a plug movable relative to the nozzle opening between a first position in which the nozzle assembly is in a closed state, and a second position in which the nozzle assembly is in an open state;

a cylinder configured to receive and store a compound material;

a main housing coupled to the cylinder;

a handle coupled to the main housing and movable relative to the main housing;

a pull rod; and an input mechanism located at least partially within the handle and/or the main housing and configured to convert motion of the handle relative to the main housing into axial movement of the pull rod, thereby moving the plug from the first position toward the second position, wherein the pull rod is biased into tension.

2. The compound applicator of claim 1, further comprising a central pull rod biased into compression.

3. The compound applicator of claim 2, wherein the pull rod is a first pull rod, the compound applicator further comprising a second pull rod biased into tension, wherein the first pull rod and the second pull rod are spaced radially about the central pull rod.

4. The compound applicator of claim 3, wherein each of the first pull rod and the second pull rod is offset from a central axis of the main housing.

5. The compound applicator of claim 1, wherein the input mechanism is configured to convert rotational motion of the handle into axial movement of the pull rod.

6. The compound applicator of claim 1, wherein at least a portion of the handle surrounds at least a portion of the main housing.

7. The compound applicator of claim 1, further comprising a movable fastener configured to couple the handle relative to the main housing at an axial position chosen from a plurality of axial positions, wherein the movable fastener is one of a pin or a spring-biased detent.

8. The compound applicator of claim 1, wherein the input mechanism includes a first cam member defining an axial cam slot, a second cam member defining an angled cam slot, and a cam follower having a first roller follower configured to roll along the axial cam slot and a second roller follower configured to roll along the angled cam slot.

9. The compound applicator of claim 8, wherein the first roller follower and the second roller follower are rotatable about a common rotational axis.

10. The compound applicator of claim 8, wherein the pull rod is coupled to the cam follower and is configured to move with the cam follower.

11. A compound applicator comprising:

a nozzle assembly including a nozzle opening and a plug movable relative to the nozzle opening between a first position in which the nozzle assembly is in a closed state, and a second position in which the nozzle assembly is in an open state;

a cylinder configured to receive and store a compound material;

a main housing coupled to the cylinder;

a handle coupled to the main housing and movable relative to the main housing; and a first pull rod and a second pull rod, wherein the first pull rod is biased into tension and the second pull rod is biased into compression, and an input mechanism configured to convert rotational motion of the handle into axial movement of the first pull rod and axial movement of the second pull rod.

12. The compound applicator of claim 11, further comprising a third pull rod biased into tension.

13. The compound applicator of claim 12, wherein the first pull rod and the third pull rod are spaced radially about the second pull rod.

14. The compound applicator of claim 12, wherein each of the first pull rod and the third pull rod is offset from a central axis of the main housing.

15. The compound applicator of claim 11, wherein the input mechanism includes a first cam member defining an axial cam slot, a second cam member defining an angled cam slot, and a cam follower having a first roller follower configured to roll along the axial cam slot and a second roller follower configured to roll along the angled cam slot.

16. The compound applicator of claim 15, wherein the first roller follower and the second roller follower are rotatable about a common rotational axis.

17. The compound applicator of claim 15, wherein the first pull rod is coupled to the cam follower and is configured to move with the cam follower.

18. The compound applicator of claim 11, wherein at least a portion of the handle surrounds at least a portion of the main housing.

19. The compound applicator of claim 11, further comprising a movable fastener configured to couple the handle relative to the main housing at an axial position chosen from a plurality of axial positions, wherein the movable fastener is one of a pin or a spring-biased detent.

* * * * *